US010193358B2

(12) United States Patent
Hansen et al.

(10) Patent No.: US 10,193,358 B2
(45) Date of Patent: Jan. 29, 2019

(54) DEEP-CHARGING POWER RESOURCES OF POWER RESOURCE GROUP HAVING IDENTIFIER CORRESPONDING TO RANGE WITHIN WHICH MODULO FALLS BASED ON CHARGING TIME

(75) Inventors: Peter Hansen, Cypress, TX (US); Darrel G Gaston, Spring, TX (US); Scott E Holloway, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 155 days.

(21) Appl. No.: 14/396,378

(22) PCT Filed: Apr. 23, 2012

(86) PCT No.: PCT/US2012/034669
§ 371 (c)(1),
(2), (4) Date: Oct. 22, 2014

(87) PCT Pub. No.: WO2013/162500
PCT Pub. Date: Oct. 31, 2013

(65) Prior Publication Data
US 2015/0137765 A1 May 21, 2015

(51) Int. Cl.
*H02J 7/00* (2006.01)
*H02J 9/06* (2006.01)
*G06F 1/30* (2006.01)

(52) U.S. Cl.
CPC .......... *H02J 7/0022* (2013.01); *H02J 7/0013* (2013.01); *H02J 7/0021* (2013.01); *H02J 9/06* (2013.01);
(Continued)

(58) Field of Classification Search
CPC ...... H02J 7/0022; H02J 7/0021; H02J 7/0013; H02J 9/06
(Continued)

(56) References Cited

U.S. PATENT DOCUMENTS 3,803,605 A * 4/1974 Case ................. G01S 13/72
342/30
3,947,767 A * 3/1976 Koike ................. H04L 25/4919
375/290
(Continued)

FOREIGN PATENT DOCUMENTS

JP 04372529 A * 12/1992

OTHER PUBLICATIONS

Takashi Ikegami, "Optimum Operation Scheduling Model of Domestic Electric Appliances for Balancing Power Supply and Demand," Oct. 24-28, 2010, pp. 1-8.
(Continued)

*Primary Examiner* — Robert Grant
*Assistant Examiner* — John Trischler
(74) *Attorney, Agent, or Firm* — Hewlett Packard Enterprise Patent Department

(57) ABSTRACT

Systems, methods, and computer-readable and executable instructions are provided for moderating a charging for a number of power resources. Moderating a charging for a number of power resources can include calculating a distinct charging window for each of the number of power resources. Moderating a charging for a number of power resources can also include selecting a first power resource from the number of power resources based on a current time and the distinct charging window for the first power resource. Furthermore, moderating a charging for a number of power (Continued)

US 10,193,358 B2

Page 2 resources can include charging the first power resource within the distinct charging window before charging a second power resource.

19 Claims, 5 Drawing Sheets

(52) U.S. Cl.
CPC ............... *G06F 1/30* (2013.01); *G06F 1/324* (2013.01); *Y02D 10/126* (2018.01)

(58) Field of Classification Search
USPC ........................................................ 320/125
See application file for complete search history.

(56) References Cited

U.S. PATENT DOCUMENTS

| | | | | |
|---|---|---|---|---|
| 4,016,474 A | * | 4/1977 | Mason | H02J 7/0022 307/41 |
| 4,158,285 A | * | 6/1979 | Heinsen | G04F 10/04 341/22 |
| 4,313,078 A | * | 1/1982 | Bilsky | H02J 7/0078 136/293 |
| 4,321,523 A | * | 3/1982 | Hammel | H02J 7/008 320/139 |
| 4,340,823 A | * | 7/1982 | Miyazawa | H02J 9/062 307/66 |
| 4,400,624 A | * | 8/1983 | Ebert, Jr. | H02J 9/062 307/43 |
| 4,475,047 A | * | 10/1984 | Ebert, Jr. | H02J 9/062 307/129 |
| 4,670,703 A | * | 6/1987 | Williams | H02J 7/0026 320/125 |
| 4,754,458 A | * | 6/1988 | Dornstetter | H03M 13/151 714/762 |
| 4,849,682 A | | 7/1989 | Bauer et al. | |
| 5,028,859 A | * | 7/1991 | Johnson | H02J 7/0024 320/124 |
| 5,055,763 A | * | 10/1991 | Johnson | H02J 7/0006 320/125 |
| 5,057,762 A | * | 10/1991 | Goedken | H02J 7/008 320/116 |
| 5,075,565 A | * | 12/1991 | Severinsky | H02J 9/062 307/66 |
| 5,121,047 A | * | 6/1992 | Goedken | H02J 7/008 320/160 |
| 5,122,722 A | * | 6/1992 | Goedken | H02J 7/0024 320/116 |
| 5,126,585 A | * | 6/1992 | Boys | H02J 9/062 307/45 |
| 5,148,043 A | * | 9/1992 | Hirata | H02J 9/062 307/46 |
| 5,266,880 A | * | 11/1993 | Newland | H02J 7/0078 320/125 |
| 5,381,554 A | * | 1/1995 | Langer | G06F 1/26 307/38 |
| 5,436,512 A | * | 7/1995 | Inam | H02J 9/062 307/105 |
| 5,438,655 A | * | 8/1995 | Richichi | G06T 11/001 345/442 |
| 5,544,150 A | * | 8/1996 | Fujimoto | H04L 43/00 370/248 |
| 5,560,022 A | * | 9/1996 | Dunstan | G06F 1/3203 710/301 |
| 5,560,023 A | * | 9/1996 | Crump | G06F 1/3203 713/321 |
| 5,596,492 A | * | 1/1997 | Divan | H02J 3/14 307/64 |
| 5,664,193 A | * | 9/1997 | Tirumalai | G06F 8/4452 712/241 |
| 5,686,812 A | * | 11/1997 | Hotta | H02J 7/0031 320/109 |
| 5,809,308 A | * | 9/1998 | Tirumalai | G06F 8/4452 717/150 |
| 5,809,313 A | * | 9/1998 | Gianni | G06F 1/3209 713/300 |
| 5,835,776 A | * | 11/1998 | Tirumalai | G06F 8/4452 717/150 |
| 5,867,711 A | * | 2/1999 | Subramanian | G06F 8/4452 717/156 |
| 6,014,012 A | * | 1/2000 | Murao | G01R 31/362 320/116 |
| 6,041,414 A | * | 3/2000 | Kikuchi | G06F 1/28 307/38 |
| 6,046,709 A | * | 4/2000 | Shelton | G06F 3/1446 345/1.1 |
| 6,191,500 B1 | * | 2/2001 | Toy | H02J 3/46 307/64 |
| 6,298,471 B1 | * | 10/2001 | Schreiber | G06F 17/5045 716/108 |
| 6,311,279 B1 | * | 10/2001 | Nguyen | G06F 1/263 307/66 |
| 6,462,511 B1 | * | 10/2002 | Kwok | H02J 7/0024 320/119 |
| 6,483,274 B2 | * | 11/2002 | Lee | H02J 7/0047 320/132 |
| 6,507,947 B1 | * | 1/2003 | Schreiber | G06F 17/5045 717/159 |
| 6,567,769 B2 | * | 5/2003 | Chang | G08B 13/22 340/286.09 |
| 6,603,799 B1 | * | 8/2003 | Hlasny | H04B 1/1027 375/132 |
| 6,671,878 B1 | * | 12/2003 | Bliss | G06F 8/4452 712/215 |
| 6,691,248 B1 | * | 2/2004 | Nishijima | G06F 1/30 714/14 |
| 6,774,602 B2 | * | 8/2004 | Ballard | H02J 7/0072 320/103 |
| 6,788,249 B1 | * | 9/2004 | Farmer | G01S 5/0263 342/357.62 |
| 6,803,679 B1 | * | 10/2004 | Luo | H02J 3/44 307/66 |
| 6,832,370 B1 | * | 12/2004 | Srinivasan | G06F 8/4452 712/241 |
| 6,917,124 B2 | * | 7/2005 | Shetler, Jr. | H02J 9/061 307/66 |
| 7,002,265 B2 | * | 2/2006 | Potega | B60L 11/185 307/149 |
| 7,009,350 B1 | * | 3/2006 | Gold | H02P 9/48 290/1 A |
| 7,061,141 B2 | * | 6/2006 | Yamamoto | H02J 3/46 307/65 |
| 7,132,833 B2 | * | 11/2006 | Layden | H01M 2/1077 320/116 |
| 7,152,175 B2 | * | 12/2006 | Madany | G06F 1/30 713/340 |
| 7,181,630 B2 | * | 2/2007 | Kadoi | G06F 1/26 709/202 |
| 7,184,905 B2 | * | 2/2007 | Stefan | G01R 19/2513 320/116 |
| 7,205,732 B1 | * | 4/2007 | Gold | H02P 9/48 290/1 A |
| 7,253,586 B2 | * | 8/2007 | Kangas | H02J 7/0013 320/124 |
| 7,350,088 B2 | * | 3/2008 | Allison | G06F 1/266 713/300 |
| 7,377,807 B2 | * | 5/2008 | Ohman | H02J 1/10 439/135 |
| 7,400,066 B2 | * | 7/2008 | Tassitino, Jr. | H02J 9/062 307/46 |
| 7,459,803 B2 | * | 12/2008 | Mosman | H02J 9/06 307/64 |
| 7,492,058 B2 | * | 2/2009 | Chen | H02J 9/062 307/64 |
| 7,500,120 B2 | * | 3/2009 | Egan | G06F 1/30 713/300 |
| 7,519,909 B2 | * | 4/2009 | Kuiawa | G06F 3/04817 715/734 |

(56) References Cited

U.S. PATENT DOCUMENTS

| | | | | |
|---|---|---|---|---|
| 7,525,218 B2* | 4/2009 | Togashi | G06F 11/1441 | 307/65 |
| 7,545,320 B2* | 6/2009 | Oster | G01S 19/256 | 342/357.42 |
| 7,561,411 B2* | 7/2009 | Johnson, Jr. | H02J 9/062 | 307/66 |
| 7,638,899 B2* | 12/2009 | Tracy | H02J 9/062 | 307/64 |
| 7,642,748 B2* | 1/2010 | Glosser, Jr. | H02J 7/0018 | 320/116 |
| 7,668,624 B2* | 2/2010 | Heber | H02J 3/46 | 307/65 |
| 7,825,541 B2* | 11/2010 | Herbener | H02J 9/066 | 307/64 |
| 7,849,335 B2* | 12/2010 | Terry | H02J 9/061 | 713/300 |
| 7,900,087 B2* | 3/2011 | Egan | G06F 1/30 | 714/14 |
| 7,911,083 B2* | 3/2011 | Cohen | H02J 9/062 | 307/64 |
| 7,986,128 B2* | 7/2011 | Kubota | H02J 7/0004 | 320/106 |
| 8,001,392 B2* | 8/2011 | Anderson | H02J 3/46 | 700/286 |
| 8,097,978 B2* | 1/2012 | Groff | H02J 9/061 | 307/18 |
| 8,125,102 B2* | 2/2012 | Cohen | H02J 9/062 | 307/64 |
| 8,200,944 B2* | 6/2012 | Lee | G06F 8/441 | 712/215 |
| 8,212,401 B2* | 7/2012 | Linkhart | H02J 9/06 | 307/64 |
| 8,212,404 B2* | 7/2012 | Zajkowski | H02J 9/061 | 307/64 |
| 8,259,008 B2* | 9/2012 | Farmer | G01S 19/05 | 342/357.24 |
| 8,271,146 B2* | 9/2012 | Heber | H02J 3/46 | 700/286 |
| 8,294,420 B2* | 10/2012 | Kocher | B60L 11/1816 | 320/107 |
| 8,324,859 B2* | 12/2012 | Rossi | B60L 11/1824 | 307/18 |
| 8,373,306 B2* | 2/2013 | Wassermann | H02J 9/04 | 307/66 |
| 8,380,999 B1* | 2/2013 | Robison | H04W 52/0261 | 320/120 |
| 8,405,361 B2* | 3/2013 | Richards | H02J 7/0055 | 320/132 |
| 8,415,831 B1* | 4/2013 | Hayes, Jr. | H05K 7/1492 | 307/66 |
| 8,508,185 B2* | 8/2013 | Basham | H02J 3/14 | 320/109 |
| 8,519,567 B2* | 8/2013 | Zajkowski | H02J 9/061 | 307/64 |
| 8,552,589 B2* | 10/2013 | Ghosh | H02J 9/062 | 307/64 |
| 8,571,089 B2* | 10/2013 | Hoang | G01S 19/243 | 375/150 |
| 8,581,554 B2* | 11/2013 | Saligram | H02J 7/0078 | 320/132 |
| 8,587,929 B2* | 11/2013 | Johnson, Jr. | H02J 9/062 | 307/32 |
| 8,643,336 B2* | 2/2014 | Reineccius | H02J 4/00 | 320/128 |
| 8,674,823 B1* | 3/2014 | Contario | H02J 1/10 | 340/333 |
| 8,686,687 B2* | 4/2014 | Rossi | B60L 11/1824 | 307/18 |
| 8,725,306 B2* | 5/2014 | Ramezani | B60L 11/1844 | 320/109 |
| 8,736,228 B1* | 5/2014 | Freed | H02J 7/025 | 320/107 |
| 8,751,085 B2* | 6/2014 | Major | G06F 17/00 | 320/109 |
| 8,798,803 B2* | 8/2014 | Bush | H02J 3/14 | 320/109 |
| 8,816,533 B2* | 8/2014 | Navarro | H02J 9/061 | 307/64 |
| 8,850,237 B2* | 9/2014 | Familiant | G06F 1/26 | 713/300 |
| 8,869,216 B2* | 10/2014 | Suh | H04H 20/40 | 725/100 |
| 8,892,775 B2* | 11/2014 | Garcia | G06Q 10/00 | 709/245 |
| 8,958,997 B2* | 2/2015 | Etaati | G01R 31/40 | 324/764.01 |
| 9,013,063 B2* | 4/2015 | Sato | H02J 9/062 | 307/64 |
| 9,054,553 B2* | 6/2015 | Colombi | H02J 9/062 | |
| 9,130,406 B2* | 9/2015 | Jain | H02J 3/46 | |
| 9,136,712 B2* | 9/2015 | Reineccius | H02J 3/32 | |
| 9,160,202 B2* | 10/2015 | Colombi | H02J 3/006 | |
| 9,236,768 B2* | 1/2016 | Giuntini | H02J 3/46 | |
| 9,239,364 B2* | 1/2016 | Sebald | G01R 31/42 | |
| 9,256,628 B2* | 2/2016 | Garcia | G06F 17/30312 | |
| 9,281,714 B2* | 3/2016 | Isomura | H02J 9/062 | |
| 9,294,275 B2* | 3/2016 | Suh | H04L 9/0836 | |
| 9,306,418 B2* | 4/2016 | Yoshida | G06F 1/263 | |
| 9,312,725 B2* | 4/2016 | Jain | H02J 9/00 | |
| 9,348,381 B2* | 5/2016 | Khoo | B60L 11/1825 | |
| 9,373,962 B2* | 6/2016 | Chen | H02J 9/062 | |
| 9,419,475 B2* | 8/2016 | Edelen | H02J 9/062 | |
| 9,425,650 B2* | 8/2016 | Giuntini | H02J 9/061 | |
| 9,429,599 B1* | 8/2016 | Contario | H02J 1/10 | |
| 9,444,286 B2* | 9/2016 | Toyoda | H02J 3/46 | |
| 2001/0015320 A1* | 8/2001 | Anderson | G01N 27/44773 | 204/606 |
| 2001/0023826 A1* | 9/2001 | Anderson | G01N 27/44773 | 204/470 |
| 2001/0045779 A1 | 11/2001 | Lee et al. | | |
| 2002/0039302 A1* | 4/2002 | Hanaoka | H02J 9/062 | 363/71 |
| 2002/0113575 A1* | 8/2002 | Lee | H02J 7/0047 | 320/132 |
| 2002/0154799 A1* | 10/2002 | Anderson | G01N 27/44773 | 382/128 |
| 2002/0175078 A1* | 11/2002 | Anderson | G01N 27/44773 | 204/461 |
| 2003/0026465 A1* | 2/2003 | Anderson | G01N 27/44773 | 382/129 |
| 2003/0026466 A1* | 2/2003 | Anderson | G01N 27/44773 | 382/129 |
| 2003/0033548 A1* | 2/2003 | Kuiawa | G06F 1/263 | 713/300 |
| 2003/0033550 A1* | 2/2003 | Kuiawa | G06F 3/04817 | 713/340 |
| 2003/0048006 A1* | 3/2003 | Shelter, Jr. | H02J 9/061 | 307/64 |
| 2003/0085624 A1* | 5/2003 | Kadoi | G06F 1/26 | 307/64 |
| 2003/0184160 A1* | 10/2003 | Yamamoto | H02J 3/46 | 307/64 |
| 2003/0231003 A1* | 12/2003 | Ballard | H02J 7/0072 | 320/116 |
| 2004/0070279 A1* | 4/2004 | Liu | H02J 9/061 | 307/64 |
| 2004/0177283 A1* | 9/2004 | Madany | G06F 1/30 | 713/300 |
| 2005/0036253 A1* | 2/2005 | Tian | H02J 3/38 | 361/66 |
| 2005/0043859 A1* | 2/2005 | Tsai | H02J 3/46 | 700/286 |
| 2005/0162836 A1* | 7/2005 | Briggs | G06F 1/181 | 361/724 |
| 2005/0200332 A1 | 9/2005 | Kangas et al. | | |
| 2005/0229037 A1* | 10/2005 | Egan | G06F 11/2015 | 714/14 |
| 2006/0138867 A1* | 6/2006 | Tian | H02J 3/38 | 307/65 |

(56) References Cited

U.S. PATENT DOCUMENTS

| | | | |
|---|---|---|---|
| 2006/0167569 A1* | 7/2006 | Colombi | H02J 3/005 700/22 |
| 2006/0168191 A1* | 7/2006 | Ives | G06F 11/3079 709/224 |
| 2006/0226706 A1* | 10/2006 | Edelen | H02J 9/06 307/64 |
| 2006/0255765 A1* | 11/2006 | Lindstrom | H02J 7/0052 320/125 |
| 2006/0279457 A1* | 12/2006 | Oster | G01S 19/256 342/357.42 |
| 2007/0007825 A1* | 1/2007 | Heber | H02J 3/46 307/67 |
| 2007/0037420 A1* | 2/2007 | Ohman | H02J 9/06 439/108 |
| 2007/0090797 A1* | 4/2007 | Glosser, Jr. | H02J 7/0018 320/116 |
| 2007/0210652 A1* | 9/2007 | Tracy | H02J 9/062 307/66 |
| 2007/0216229 A1* | 9/2007 | Johnson, Jr. | G06F 1/30 307/86 |
| 2007/0217125 A1* | 9/2007 | Johnson | H02J 9/062 361/600 |
| 2007/0217178 A1* | 9/2007 | Johnson, Jr. | H05K 7/1457 361/826 |
| 2007/0281755 A1 | 12/2007 | Dwelley | |
| 2008/0211308 A1* | 9/2008 | Lin | H02J 9/062 307/65 |
| 2008/0238370 A1* | 10/2008 | Carrier | H01M 2/1022 320/134 |
| 2008/0272655 A1* | 11/2008 | Vaughan | H02J 9/06 307/66 |
| 2009/0009001 A1* | 1/2009 | Marwali | H02J 9/061 307/65 |
| 2009/0033154 A1* | 2/2009 | Linkhart | H02J 9/06 307/65 |
| 2009/0033283 A1 | 2/2009 | Beg et al. | |
| 2009/0079394 A1* | 3/2009 | Richards | H02J 7/0055 320/134 |
| 2009/0091189 A1* | 4/2009 | Soeda | H02J 1/00 307/66 |
| 2009/0218986 A1* | 9/2009 | Jarvinen | B60L 11/185 320/119 |
| 2009/0326729 A1 | 12/2009 | Hakim et al. | |
| 2010/0037037 A1* | 2/2010 | Lee | G06F 8/441 712/205 |
| 2010/0082173 A1* | 4/2010 | Heber | H02J 3/46 700/292 |
| 2010/0102636 A1* | 4/2010 | Tracy | H02J 9/062 307/80 |
| 2010/0149026 A1* | 6/2010 | Farmer | G01S 19/05 342/357.31 |
| 2010/0156354 A1* | 6/2010 | Nielsen | H02J 1/102 320/137 |
| 2010/0262852 A1* | 10/2010 | Hsu | G06F 1/3228 713/323 |
| 2010/0308661 A1 | 12/2010 | Garcia et al. | |
| 2011/0006607 A1 | 1/2011 | Kwon et al. | |
| 2011/0006737 A1* | 1/2011 | Saligram | H02J 7/0078 320/134 |
| 2011/0074350 A1* | 3/2011 | Kocher | B60L 11/1816 320/109 |
| 2011/0084648 A1 | 4/2011 | Cao et al. | |
| 2011/0109266 A1* | 5/2011 | Rossi | B60L 11/1824 320/109 |
| 2011/0121791 A1* | 5/2011 | Basham | H02J 3/14 320/162 |
| 2011/0141347 A1* | 6/2011 | Suh | H04H 20/40 348/426.1 |
| 2011/0175569 A1* | 7/2011 | Austin | B60L 11/1824 320/109 |
| 2011/0213656 A1* | 9/2011 | Turner | B60L 3/12 705/14.49 |
| 2011/0279083 A1* | 11/2011 | Asai | B60L 11/1816 320/109 |
| 2011/0285345 A1* | 11/2011 | Kawai | B60L 11/1825 320/107 |
| 2012/0013193 A1* | 1/2012 | Sato | H02J 9/062 307/80 |
| 2012/0044796 A1* | 2/2012 | Yoon | G01S 1/042 370/208 |
| 2012/0098488 A1* | 4/2012 | Ichikawa | B60L 11/1816 320/109 |
| 2012/0112696 A1* | 5/2012 | Ikeda | B60L 11/1816 320/109 |
| 2012/0119580 A1* | 5/2012 | Zajkowski | H02J 9/061 307/64 |
| 2012/0161692 A1* | 6/2012 | Kobayashi | B60L 11/1862 320/101 |
| 2012/0235480 A1* | 9/2012 | Kim | H02J 9/062 307/18 |
| 2013/0043729 A1* | 2/2013 | Yoshida | G06F 1/263 307/65 |
| 2013/0049704 A1* | 2/2013 | Andou | G06F 1/266 320/162 |
| 2013/0076296 A1* | 3/2013 | Ushiroda | B60L 3/12 320/101 |
| 2013/0088198 A1* | 4/2013 | Masuda | H02J 7/044 320/109 |
| 2013/0141043 A1* | 6/2013 | Rossi | B60L 11/1824 320/109 |
| 2013/0154377 A1* | 6/2013 | Isomura | H02J 9/062 307/65 |
| 2013/0187467 A1* | 7/2013 | Chen | H02J 9/062 307/64 |
| 2013/0293199 A1* | 11/2013 | Basham | H02J 3/14 320/124 |
| 2013/0342164 A1* | 12/2013 | Choi | H02J 7/007 320/109 |
| 2014/0002025 A1* | 1/2014 | Yamamoto | H01M 10/443 320/109 |
| 2014/0015456 A1* | 1/2014 | Nishio | B60L 7/14 318/376 |
| 2014/0054965 A1* | 2/2014 | Jain | H02J 3/46 307/65 |
| 2014/0054966 A1* | 2/2014 | Jain | H02J 9/00 307/65 |
| 2014/0054967 A1* | 2/2014 | Toyoda | H02J 3/46 307/65 |
| 2014/0125281 A1* | 5/2014 | Mitsutani | H01M 10/48 320/109 |
| 2014/0140511 A1* | 5/2014 | Suh | H04L 9/0836 380/273 |
| 2014/0159658 A1* | 6/2014 | Kiceniuk, Jr. | B60L 11/1816 320/109 |
| 2014/0210271 A1* | 7/2014 | Toyoda | H02J 3/46 307/66 |
| 2014/0253034 A1* | 9/2014 | Kurimoto | B60L 11/182 320/109 |
| 2014/0253036 A1* | 9/2014 | Kinomura | H02J 7/0004 320/109 |
| 2015/0012957 A1* | 1/2015 | Suh | H04H 20/40 725/110 |
| 2015/0046961 A1* | 2/2015 | Suh | H04H 20/40 725/100 |
| 2016/0054394 A1* | 2/2016 | Jouper | G01R 31/008 307/9.1 |
| 2016/0079807 A1* | 3/2016 | Nguyen | H02J 3/1842 307/66 |
| 2016/0126763 A1* | 5/2016 | Basham | H02J 3/14 320/148 |

OTHER PUBLICATIONS

ISA/KR, International Search Report, dated Nov. 30, 2012, PCT/US2012/034669, pp. 1-8.

* cited by examiner

DEEP-CHARGING POWER RESOURCES OF POWER RESOURCE GROUP HAVING IDENTIFIER CORRESPONDING TO RANGE WITHIN WHICH MODULO FALLS BASED ON CHARGING TIME

BACKGROUND

Uninterruptible power supply (UPS) units can be utilized in electrical environments where a number of electronics depend on a constant and stable power supply. Power interruptions can create problems with many electronics. A UPS unit can provide instantaneous or near-instantaneous protection from power interruptions with a main power supply.

DETAILED DESCRIPTION

Examples of the present disclosure include methods, systems, and computer-readable and executable instructions for moderating a charging for a number of power resources. Moderating a charging for a number of power resources can include calculating a distinct charging window for each of the number of power resources. Moderating a charging for a number of power resources can also include selecting a first power resource from the number of power resources based on a current time and the distinct charging window for the first power resource. Furthermore, moderating a charging for a number of power resources can include charging the first power resource within the distinct charging window before charging a second power resource.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

A number of UPS units can be utilized to protect an enclosed computing environment (e.g., data center, Performance Optimized Datacenter (POD), Eco-POD, etc.). The number of UPS units can be connected to a number of power resources (e.g., batteries). The number of power resources can be recharged utilizing a utility power of the enclosed computing environment. The number of power resources can each be charged during a number of distinct charging windows and maintain a desired power budget.

Figure 1:
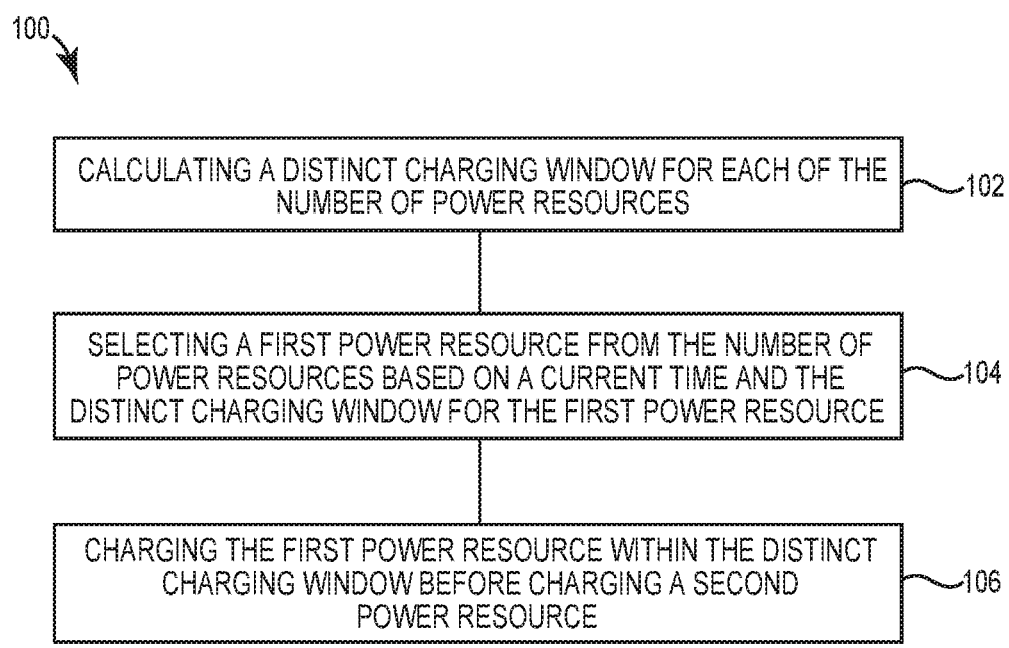
FIG. 1 illustrates a flow chart of an example method for moderating a charging for a number of power resources according to the present disclosure.

FIG. 1 illustrates a flow chart of an example method 100 for moderating a charging for a number of power resources according to the present disclosure. The number of power resources can be any number of power resources with electrochemical reactions that are electrically reversible (e.g., secondary cell batteries, storage batteries, rechargeable batteries, accumulator group comprising one or more electrochemical cells, etc.).

At 102, a distinct charging window for each of the number of power resources is calculated. The distinct charging window can be a period of time designated to a number of selected power resources from a total number of power resources. For example, the number of selected power resources can have a distinct charging window that is during a different period of time than the remaining power resources and/or non-selected power resources of the total number of power resources.

The distinct charging window can be calculated based on a number of criteria (e.g., a power budget, a total number of chargers, a charging level, a number of groups, etc.). The distinct charging window can be recalculated as the number of criteria changes. For example, the total number of power resources can change, which can change the distinct number of charging windows for each of the number of power resources.

The distinct charging window can be calculated based on a power budget. The power budget can include an overall power capability for an enclosed computing environment. For example, the enclosed computing environment can be powered by a utility provider. The location of the enclosed computing environment can limit the overall power capability of the enclosed computing environment.

The overall power capability can be utilized to determine a number of electronic devices that can be operated within the enclosed computing environment. For example, each of the number of electronic devices can have a power usage. The power usage can be a power load (e.g., information technology (IT) load, power draw, power requirement, etc.) that can be desired for a sustainable and/or desired performance of the electronic device. For example, an individual electronic device can have a manufacturer suggested power load of 200 Watts (W) to perform to manufacturer specifications.

A number of electronic devices can operate with a higher and/or lower power load than the manufacturer suggested power load. For example, a number of computing devices can change a clock speed in order to utilize a higher and/or lower power load. For example, a computing device can be set to an increased clock speed and operate with a higher power load. In another example, a computing device can be set to a lower clock speed and operate with a lower power level and/or a capped power level.

A number of chargers can also be included in the number of electronic devices that can have a power usage within the enclosed computing environment. The number of chargers can be a number of electrical units that are capable of reversing the electrochemical reaction of the power resource. For example, the number of chargers can be a number of battery chargers that force electric current through a secondary cell and/or rechargeable battery.

The number of chargers can have a number of charging levels and each charging level can have a power usage (e.g., power draw). The number of chargers can have a deep charge level that can require a relatively high power draw compared to other charge levels. For example, the deep charge level can have a power draw of 550 W. The number of chargers can also have a float charge level that can require a relatively low power draw compared to the deep charge level. For example, the float charge level can have a power draw of 90 W. The number of chargers can also have a sleep charge level that can also have a relatively low power draw compared to the deep charge level and a relatively low power draw compared to the float charge level. For example, the sleep charge level can have a power draw less than 5 W. In another example, the sleep charge level can be the charger with the power off and can have a power draw of 0 W.

The number of chargers can be powered by the same utility power and can be powered by the same overall power capability. The number of chargers can be considered when calculating the power budget. The deep charging level can be used to determine a total power draw for the number of chargers. The deep charging level can be used in case all of the chargers go into a deep charging level at the same time. Therefore, even though the number of chargers can have a number of charging levels, a total power draw for the number of chargers can be considered in order to avoid a power draw that is greater than the overall power capability. For example, if there are ten chargers in an enclosed computing environment and each charger has a deep charging level of 550 W, an overprovision of the power budget can include 5,500 W for the ten chargers. The previous example can provide for all chargers initiating a deep charging level simultaneously.

The total power draw for the number of chargers can be altered in order to accommodate a specific power budget. For example, a number of chargers representing a subset of the total number of chargers can be designated to a distinct charging window, wherein only the number of chargers within the designated charging window can utilize the deep charging level. The number of chargers not within the designated charging window can be in the float charging level and/or the sleep charging level.

When the number of chargers are designated to a distinct charging window, a total power draw of the number of chargers within the distinct charging window and outside of the distinct charging window can be calculated. For example, if two chargers are within a designated charging window having a power draw of 550 W for each charger and eight chargers are outside the designated charging window having a power draw of 90 W for each charger, it can be calculated that during the designated charging window the total power draw for the number of chargers can be 1,820 W.

In the previous example, the total power draw for the number of chargers with a number of charge levels can be predicted to have a total power draw of 1,820 W. The predicted total power draw can be altered to accommodate other factors within the enclosed computing environment (e.g., overall power capability, power usage of a number of electronic devices, safety buffer, etc.). For example, if the overall power capability for an enclosed computing environment was 5,000 W and a desired number of electronic devices require 3,500 W then the total power draw for the number of chargers could be altered to be within 1,500 W.

Any number of features can be altered to lower the total power draw of the number of chargers (e.g., deep charging level, float charging level, number of chargers within a designated charging window, time to charge, turning off the number of chargers, etc.). For example, in the example above there are two chargers designated to a charging window with a deep charge of 550 W. If only one of the chargers is designated to the charging window with a deep charge of 550 W, and a remaining number of nine chargers outside the charging window, each have a float charge of 90 W, the total power draw for the number of chargers can be 1,360 W. In this example, the total power draw for the number of chargers can be within the 1,500 W and allow for a safety buffer.

The previous example can be an example of increasing the number of power resource groups. For example, if there are a total of ten chargers and two chargers are within five charging windows there can be five groups of chargers. When only one charger is within a charging window, there can be ten groups of chargers. Increasing the number of groups of chargers can lower the total power draw of the number of chargers as shown in the previous example.

The safety buffer can account for a number of devices that vary in the amount of power load they draw. For example, an electronic device can be designed to have a power load of 200 W, but at times the electronic device could have a power load of 210 W. The safety buffer could allow for the number of electronic devices to vary to a higher power load and still remain within the overall power capability.

The number of chargers can also have a designated amount of time to charge based on a number of factors (e.g., a charge status, how long it takes for a power resource to charge from a particular charge status, number of power resources, number of groups, the chemistry of the battery technology deployed, etc.). For example, the number of chargers can be designated to have a time of 35 minutes to charge. That is, the distinct charging window can have a duration of 35 minutes. The duration can be the amount of time it takes a charger to fully charge a power resource that is below a predetermined threshold.

At 104, a first power resource from the number of power resources is selected based on a current time and the distinct charging window for the first power resource.

A computing device can be communicatively coupled to a number of chargers that are utilized for charging the number of power resources. For example, the computing device can be an advanced power management (APM) unit (e.g., SL-APM). The computing device can determine whether a number of power resources are within the distinct charging window. For example, the computing device can determine the current time and utilize the current time to calculate if the power resource is within the distinct charging window.

The computing device can calculate whether or not a power resource is within the distinct charging window utilizing a current time, a total number of charging units, and a designated group number.

The current time can be determined individually for each of the number of chargers that correspond to each of the number of power resource. For example, a computing device communicatively connected to the number of chargers can utilize a real time clock to determine the current time. The current time can be an amount of time that has transpired from a specified time. For example, a date of Jan. 1, 1970 can be the specified time and the amount of time can be in minutes that have transpired from Jan. 1, 1970. The time can initially be sourced from a common network source using standard protocols such as SNMP (Simple Network Management Protocol) or NTP (Network Time Protocol).

The total number of chargers can be the total number of chargers and/or total number of UPS units within an enclosed computing environment. For example, there can be a total number of UPS units within an enclosed computing environment and each UPS unit can comprise a charger. The total number of chargers can each be placed into a number of groups. The total number of groups can be the total number of designated groups for an enclosed computing center.

The first power resource can have a designated group number. For example, if there are three groups, the first power resource could be in group 1. Each group can comprise a various number of power resources and/or UPS units. For example, if there are three groups designated group 1, group 2, and group 3, each group could potentially have a different number of power resources and/or a different number of UPS units. Each group can also comprise the same number of power resources and/or the same number of UPS units.

A number of computing devices can also be connected to each of the number of UPS units and/or chargers. For example, an APM can be communicatively coupled to each of the number of chargers (e.g., UPS units). In the same example, each APM communicatively coupled to each charger can be independent from the other APM. For example, the APM for a first charger may not be able to communicate with an APM for a second charger.

The APM can be connected to a digital signal processor (DSP) operating within a UPS unit. The DSP unit can control, among other things, the rate of current that the USP unit's charger is allowed to utilize. For example, The DSP unit can control the amount of electrical energy utilized by the UPS charger and the APM can provide instructions to the DSP unit.

The number of computing devices can calculate if the power resource is within the distinct charging window during runtime by performing a calculation described herein. For example, the number of computing devices can perform the calculation every 20 seconds to determine if the power resource is within the distinct charging window.

The calculation can comprise dividing the number of minutes that have transpired from the specified time by the time that the charger is allowed to charge multiplied by the total number of groups. For example, the amount of time that has transpired from Jan. 1, 1970 (in minutes) can be divided by 35 minutes or the amount of time the charger is allowed to charge (in minutes) multiplied by 17 or the total number of groups.

A modulo from the calculation can be compared to a second step of the calculation. The modulo can be a remainder of an answer to the first step of the calculation.

The calculation can further comprise determining a range between a first value and a second value. The first value can be the designated group number multiplied by the amount of time the charger is allowed to charge (in minutes). For example, the designated group number can be from group 1, wherein the group number is one. The amount of time the charger is allowed to charge (in minutes) can be designated based on a number of factors as discussed herein. For example, the amount of time the charger is allowed to charge can be 35 minutes. In the previous examples, the first value is 1 multiplied by 35 minutes, with a resulting value of 35.

The second value can be the designated group number plus a value of one multiplied by the amount of time the charger is allowed to charge. For example, if the designated group number is group 1, the group number plus one is equal to a value of two. The value of two can then be multiplied by the amount of time the charger is allowed to charge. For example the value of two can be multiplied by 35 minutes, with a resulting value of 70.

In this example, group 1 can be within the designated charging window when the modulo falls between 35 and 70. The modulo can change as the time in minutes increases from the designated time (e.g., Jan. 1, 1970).

If the modulo falls within the first value and the second value the computing device can enable the charger to perform a deep charge on the designated number of power resources. For example, if the modulo in the previous example is 38, the computing device can initiate (e.g., turn on) a charger that the computing device is communicatively connected to and instruct the charger to start a deep charge level on the power resource. If the modulo in the previous example is 75, the computing device can instruct the charger to start and/or continue a float charge level on the power resource.

A gap can be utilized to allow for inaccuracies in the real time clock. For example, the computing device can determine if it within two minutes of the start of the distinct charging window or within two minutes of the end of the distinct charging window and either delay and/or end the deep charging level respectively. The gap can ensure that only one group is initiating a deep charging level at any given time.

A number of calculations and/or methods can be implemented in order to designate a distinct charging window for the number of power resources. In the previous example, each of the groups can have a distinct charging window. Each group can comprise a number of power resources. For example, group 1 can comprise only one power resource. In another example group 1 can comprise three power resources.

At 106, the first power resource that is within the distinct charging window is charged before a second power resource is charged. As discussed herein, the first power resource that is within the distinct charging window can be charged at a deep charging level while the remaining power resources (including the second power resource) can either be at a float charge level and/or a sleep charge level (e.g., charger is turned off). The first power resource can be charged until it is no longer within the distinct charging window, wherein a second power resource can be within a distinct charging window that can result in the second power resource to be charged at a deep charging level.

The first power resource can be checked for a charge status when the first power resource is within the distinct charging window. The charge status can be a level of charge that is available within the first power resource. For example, the charge status for the first power resource can be a low charge status. The low charge status can indicate that the first power resource is nearing an end of the electrochemical reaction and therefore may not be able to provide electrical power to a number of electrical devices for an extended period of time. In another example, the charge status for the first power resource can be a high charge status. The high charge status can indicate that the first power resource is at or near a beginning of the electrochemical reaction and therefore can provide electrical power to a number of electrical devices for an extended period of time.

If the charge status is at or above a predetermined threshold of a charge status, it can be determined that during the distinct charging window the charger will remain at a float charging level instead of changing to a deep charging level. It can also be determined that the charge status is at or above a predetermined threshold during a deep charging level and the charger can be instructed by the computing device to change to a float charge during a deep charging level.

Figure 2:
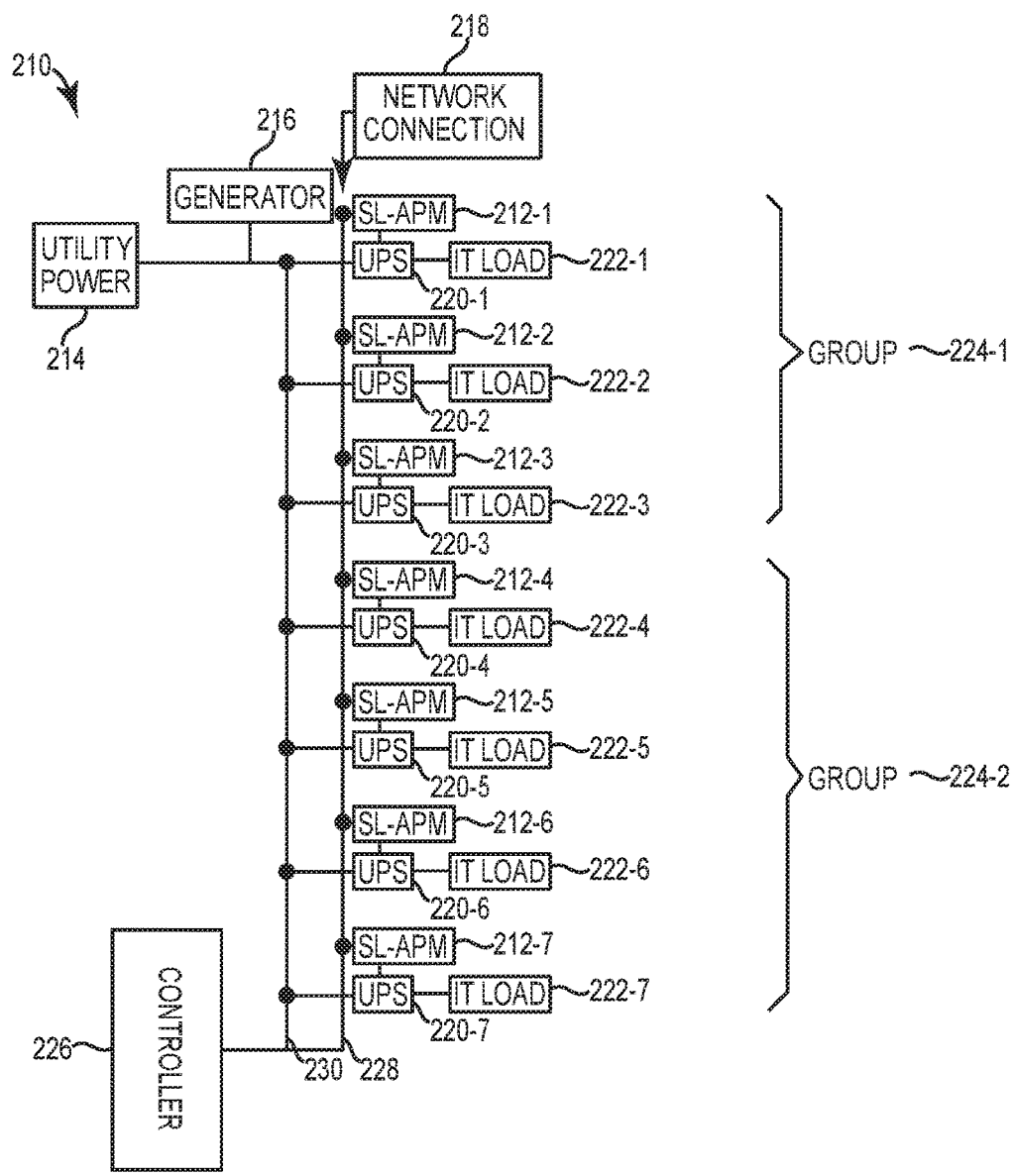
FIG. 2 illustrates a diagram of an example system for moderating a charging for a number of UPS units within an enclosed computing environment according to the present disclosure.

FIG. 2 illustrates a diagram of an example system 210 for moderating a charging for a number of UPS units within an enclosed computing environment according to the present disclosure. As described herein, the enclosed computing environment can include a data center, a POD, an Eco-POD, etc.

A utility power 214 can be an operating power supply that can be connected to a power grid. The utility power 214 can be electricity that is capable of powering a number of electrical devices (e.g., servers, computing devices, etc.). The utility power 214 can have power limitations such that a limited amount of power can be drawn from a number of electrical devices. For example, the utility power can have a power limitation of 23,565 W. In this example, there can be a system failure and/or other consequences for exceeding the power limitation of 23,565 W. Due to possible consequences of exceeding the power limitation of the utility power 214, it can be advantageous to consider an amount of operating power for the number of electrical devices within the enclosed computing environment. The power limitations can be utilized to develop a power budget. The power budget can be a maximum power load for the enclosed computing environment to operate at a desired level. For example, the power budget can be the power load where a number of computing devices can operate at desired settings (e.g., power usage, performance capabilities, clock speed, etc.).

A generator 216 can be connected to a power grid 230 of the enclosed computing environment. For example, if there is a power failure from the utility power 214, the generator 216 can produce electrical power to power the electrical devices within the enclosed computing environment.

A network connection 218 can connect the electrical devices within the enclosed computing environment to a network (e.g., LAN, WAN, Internet, Intranet, etc.). For example, the enclosed computing environment can comprise a number of servers and/or databases that can be accessed by a number of outside users via the network connection 218.

A number of UPS units 220-1, 220-2, . . . , 220-7 can be connected to the power grid 230. The power that received from the utility power 214 can be routed through each of the number of UPS units 220-1, 220-2, . . . , 220-7. As described herein, a UPS unit can provide protection to a number of electrical devices from power surges and/or power failures. The number of electrical devices can be damaged or sustain interrupted service if there is a power surge and/or power failure. The UPS unit can detect a power surge and/or power failure and provide power to the number of electrical devices utilizing a number of power resources.

The number of UPS units 220-1, 220-2, . . . , 220-7 can be connected to an IT load 222-1, 222-2, . . . , 222-7 that can comprise a number of electronic devices (e.g., servers, computing devices, databases, etc.).

The number of UPS units 220-1, 220-2, . . . , 220-7 can be connected to a number of SL-APM 212-1, 212-2, . . . , 212-7. As described herein the number of SL-APM 212-1, 212-2, . . . , 212-7 can be a computing device that can perform a number of functions. For example, the number of SL-APM 212-1, 212-2, . . . , 212-7 can, among other functions, calculate a distinct charging window for a corresponding UPS unit, determine if the corresponding UPS unit is within the distinct charging window, initiating a charger to charge a power resource within the corresponding UPS unit.

The number of SL-APM 212-1, 212-2, . . . , 212-7 can be connected to the network connection 218 and to an intranet connection 228 between the number of UPS units. The number of SL-APM 212-1, 212-2, . . . , 212-7 can utilize the network connection 218 and/or intranet connection 228 to perform a number of functions. For example the number of SL-APM 212-1, 212-2, . . . , 212-7 can regulate the power consumption of the IT load 222-1, 222-2, . . . , 222-7.

The number of SL-APM 212-1, 212-2, . . . , 212-7 can regulate the power consumption of the IT load during charging of the number of power resources connected to the number of UPS units 220-1, 220-2, . . . , 220-7. For example, the SL-APM 212-1, 212-2, . . . , 212-7 can regulate the charge level (e.g., deep charging level, float charging level, sleep charging level, etc.). For example, the SL-APM 212-1, 212-2, . . . , 212-7 can determine how many Watts the charger will utilize during the deep charging level.

The number of SL-APM 212-1, 212-2, . . . , 212-7 can determine a charge status of the number of UPS units 220-1, 220-2, . . . , 220-7. For example, the SL-APM 212-1 can determine the charge status for a power resource within UPS unit 220-1. As described herein the charge status can be utilized by the SL-APM 212-1 to determine a charging level for UPS unit 220-1 during the distinct charging window for UPS unit 220-1. The charging level can also be determined during a deep charging level and automatically adjusted by the charger based on the charge status. For example, a charger can start a deep charging level at 555 W and during the deep charging level automatically lower the charging level to the float charging level if the charge status is above a predetermined threshold.

The number of SL-APM 212-1, . . . , 212-7 can be independent from one another (e.g., one to one relationship with the corresponding UPS unit). For example, SL-APM 212-1 could have no communication capability with SL-APM 212-2. As described herein, this can be accomplished with a calculation utilizing the number of groups, the group number, the amount of time allowed to charge, etc. The number of SL-APM 212-1, 212-2, . . . , 212-7 can also control more than one corresponding UPS unit. For example, SL-APM 212-1 could control UPS unit 220-1 and UPS unit 220-2.

As described herein, the number of UPS units 220-1, 220-2, . . . , 220-7 can be designated into a number of groups 224-1, 224-2. The groups 224-1, 224-2 can comprise any number of UPS units. For example, group 224-1 includes UPS units 220-1, 220-2, and 220-3. Each of the groups 224-1, 224-2 can include a different number of UPS units. For example, group 224-1 includes three UPS units 220-1, 220-2, and 220-3, while group 224-2 includes four UPS units 220-4, 220-5, 220-6, 220-7.

A controller 226 can be a computing device to change or maintain settings within the enclosed computing environment. For example, the controller can change cooling settings within the enclosed computing environment. The controller 226 can record a number of data that is occurring within the enclosed computing environment. For example, the controller 226 can record data that includes short term and long term data regarding power consumption and usage. The controller 226 can also be utilized to synchronize the real time clock for each of the number of SL-APM 212-1, . . . , 212-7.

In FIG. 2 there is an example with two groups 224-1, 224-2 and seven UPS units 220-1, 220-2, . . . , 220-7, however the calculations and distinct charging windows can be utilized with any number of UPS units and any number of groups, for example.

Figure 3:
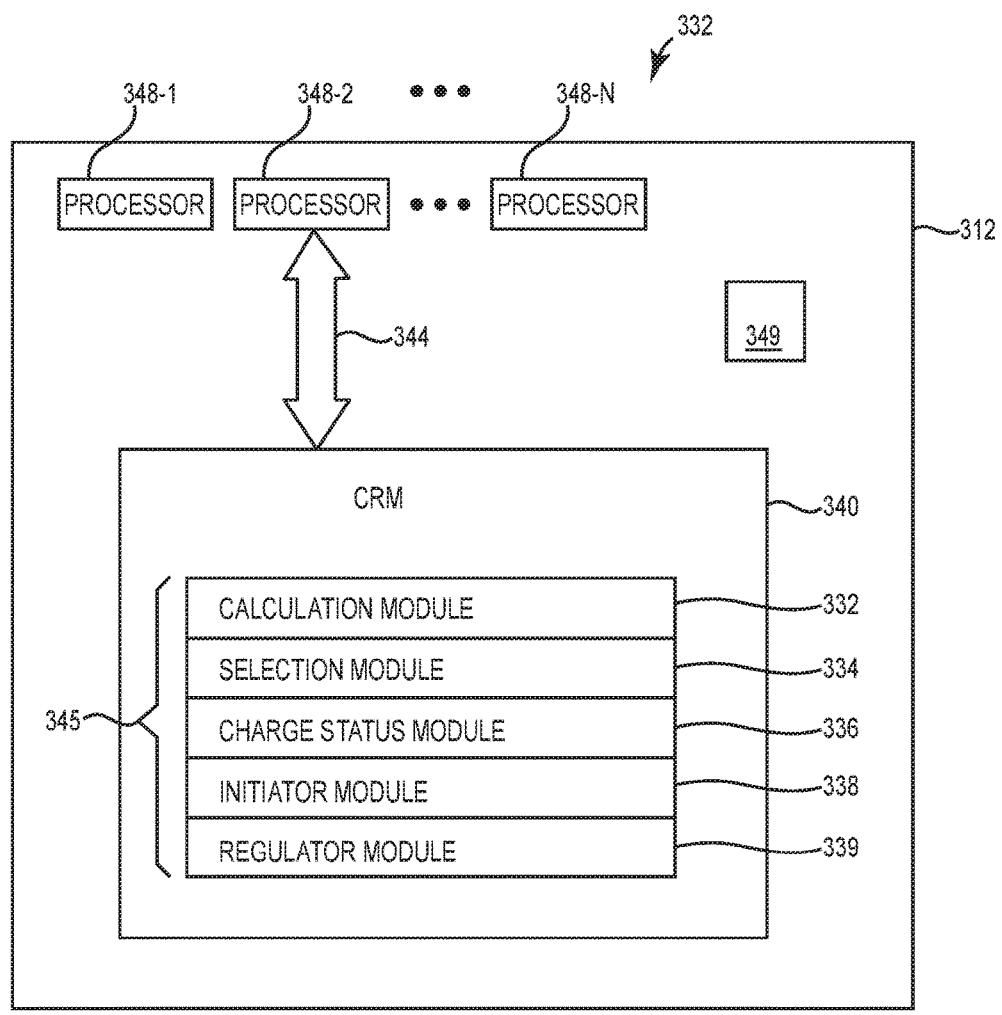
FIG. 3 illustrates a computing system for moderating a charging for a number of power resources according to the present disclosure.

FIG. 3 illustrates an example computing system 332 according to an example of the present disclosure. The computing system 332 can include a computing device 312 that can utilize software, hardware, firmware, and/or logic to moderate a charging for a number of power resources according to the present disclosure. The computing device 312 can include the SL-APM 212 described in FIG. 2.

The computing device 312 can be any combination of hardware and program instructions configured to moderate a charging for a number of power resources according to the present disclosure. The hardware, for example can include one or more processing resources 348-1, 348-2, . . . , 348-N, computer readable medium (CRM) 340, memory resources 349, etc. The program instructions (e.g., computer-readable instructions (CRI) 345) can include instructions stored on the CRM 340 and executable by the processing resources 348-1, 348-2, . . . , 348-N to implement a desired function (e.g., calculate a distinct charging window, determine a charge status, initiate a charger, regulate power consumption of a number of devices, etc.).

CRM 340 can be in communication with a number of processing resources of more or fewer than 348-1, 348-2, . . . , 348-N. The processing resources 348-1, 348-2, . . . , 348-N can be in communication with a tangible non-transitory CRM 340 storing a set of CRI 345 executable by one or more of the processing resources 348-1, 348-2, . . . , 348-N, as described herein. The CRI 345 can also be stored in remote memory managed by a server and represent an installation package that can be downloaded, installed, and executed. The computing device 312 can include memory resources 349, and the processing resources 348-1, 348-2, . . . , 348-N can be coupled to the memory resources 349.

Processing resources 348-1, 348-2, . . . , 348-N can execute CRI 345 that can be stored on an internal or external non-transitory CRM 340. The processing resources 348-1, 348-2, . . . , 348-N can execute CRI 345 to perform various functions, including the functions described in FIG. 1 and FIG. 2. For example, the processing resources 348-1, 348-2, . . . , 348-N can execute CRI 345 to implement the functions of the SL-APM 212 from FIG. 2.

The CRI 345 can include a number of modules 332, 334, 336, 338, 339. The number of modules 332, 334, 336, 338, 339 can include CRI that when executed by the processing resources 348-1, 348-2, . . . , 348-N can perform a number of functions. The number of modules 332, 334, 336, 338, 339 can be within separate and distinct computing devices and/or the number of modules 332, 334, 336, 338, 339 can be within a single computing device 312.

A calculation module 332 can be utilized to calculate the distinct charging window for the number of power resources. For example, the calculation module can determine the amount of time for each distinct charging window and designate a number of groups for each of the power resources. For example, the calculation module 332 can use, among other information, the total number of power resources, the time it can take to fully charge a power resource, the power budget, etc.

The calculation module 332 can be utilized to maintain a specific power budget by creating a number of distinct charging windows to mitigate and cycle a current rate across a number of power resources. For example, the calculation module 332 can utilize a power budget to determine a desired number of groups, a desired amount of charge time, a desired charge level, a desired charge status threshold, and/or a desired designated start time. For example, the calculation module 332 can determine from decrease in a power budget that an increase in the number of groups is necessary with fewer UPS units in each group and a longer period of time for a distinct charging window. The previous example can result in a decrease in the total power budget of the enclosed computing environment and allow the enclosed computing environment to maintain the desired decrease in the power budget.

A selection module 334 can be utilized to perform a selection calculation. The selection calculation can be the calculation described herein to determine if the power resource is within the distinct charging window for the power resource. The selection module 334 can perform the selection calculation at a periodic time interval. For example, the calculation to determine if a power resource is within the distinct charging window can be done every 20 seconds. The selection module can also recognize a determined gap between the number of distinct charging windows.

A charge status module 336 can test and determine a charge status for the power resource. For example, prior to initiating a deep charging level during the distinct charging window, the charge status module 336 can determine the charge status of the power resource. If the charge status module determines that the charge status for the power resource is above a predetermined threshold it can be determined that the deep charging level is not desired (e.g., can be damaging to the power resource, can be an undesired use of power capability, etc.). If it is determined that the deep charging level is not desired the deep charging level may not be initiated.

In another example, the charge status for the power resource can be below a predetermined threshold and it can be determined that the deep charging level is desired. If it is determined that the deep charging level is desired, the deep charging level can be initiated by the initiator module 338 for a period of time. For example, the deep charging level can be initiated by the initiator module 338 during the entire time of the distinct charging window. In another example, the deep charging level can be initiated by the initiator module 338 during only a portion of the time during the distinct charging window. The charge status module 336 can periodically check the charge status of the power resource that is being charged at a deep charging level and if the charge status is above the predetermined threshold the deep charging level can be stopped and/or switched by the initiator module 338 to a different charging level (e.g., float charging level, sleep charging level, etc.).

A regulator module 339 can regulate a power consumption and/or power usage for a number of electrical devices. For example, if a computing device under regular operating conditions utilizes 200 W of electricity, the regulator module 339 can lower the amount of electricity utilized by the computing device to 175 W. Regular operating conditions can include operating conditions below maximum capacity and above a minimum threshold capacity. The regulator module 339 can also increase the power consumption and or power usage capabilities of a number of electrical devices. For example, if the computing device were running at or near capacity, the regulator module could enable the computing device to utilize a desired amount of electricity greater than the regular operating conditions (e.g., 220 W). The regulator module 339 can increase and/or decrease the power consumption of the number of electrical devices in a number of ways. For example, the regulator module 339 can alter the clock speed of a number of computing devices.

The regulator module 339 can utilize a power budget to determine a desired power consumption for a number of devices. For example, the regulator module 339 could determine that the current power consumption for a number of devices is above a predetermined threshold (e.g., a quantity of electricity, a wattage near the power budget, etc.). The regulator module 339 can decrease the power consumption of a number of devices in order to increase the power consumption of other devices while maintaining an overall power usage under the power budget. For example, if it is determined that a deep level charging will exceed the power budget, the regulator module can decrease the power consumption of a number of other electrical devices prior to the initiator module 338 initiating the deep level charging of the power resource.

The regulator module 339 can cap the power consumption of a number of devices. For example, the regulator module can restrict a computing device to not exceed a power consumption of 200 W during a designated period of time (e.g., a distinct charging window).

A non-transitory CRM 340, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 340 can be integral, or communicatively coupled, to a computing device, in a wired and/or a wireless manner. For example, the non-transitory CRM 340 can be an internal memory, a portable memory, a portable disk, or a memory associated with another computing resource (e.g., enabling CRIs to be transferred and/or executed across a network such as the Internet).

The CRM 340 can be in communication with the processing resources 348-1, 348-2, . . . , 348-N via a communication path 344. The communication path 344 can be local or remote to a machine (e.g., a computer) associated with the processing resources 348-1, 348-2, . . . , 348-N. Examples of a local communication path 344 can include an electronic bus internal to a machine (e.g., a computer) where the CRM 340 is one of volatile, non-volatile, fixed, and/or removable storage medium in communication with the processing resources 348-1, 348-2, . . . , 348-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 344 can be such that the CRM 340 is remote from the processing resources e.g., 348-1, 348-2, . . . , 348-N, such as in a network connection between the CRM 340 and the processing resources (e.g., 348-1, 348-2, . . . , 348-N). That is, the communication path 344 can be a network connection. Examples of such a network connection can include a local area network (LAN), wide area network (WAN), personal area network (PAN), and the Internet, among others. In such examples, the CRM 340 can be associated with a first computing device and the processing resources 348-1, 348-2, . . . , 348-N can be associated with a second computing device (e.g., a Java® server, a SL-APM, etc.). For example, a processing resource 348-1, 348-2, . . . , 348-N can be in communication with a CRM 340, wherein the CRM 340 includes a set of instructions and wherein the processing resource 348-1, 348-2, . . . , 348-N is designed to carry out the set of instructions.

The processing resources 348-1, 348-2, . . . , 348-N coupled to the memory 349 can execute CRI 349 to receive a distinct charging window for a coupled UPS unit. The processing resources 348-1, 348-2, . . . , 348-N coupled to the memory 349 can also execute CRI 345 to determine a charge status of the UPS unit. The processing resources 348-1, 348-2, . . . , 348-N coupled to the memory 349 can also execute CRI 345 to enable a deep charger to charge the coupled UPS unit at a first rate when within the distinct charging window and when the charge status is below a predetermined threshold. The processing resources 348-1, 348-2, . . . , 348-N coupled to the memory 349 can also execute CRI 345 to enable a float charger to charge the coupled UPS at a second rate when outside the distinct charging window. The processing resources 348-1, 348-2, . . . , 348-N coupled to the memory 349 can also execute CRI 345 to regulate power consumption for the UPS unit and for a number of other devices operating within an overall power budget Furthermore, the processing resources 348-1, 348-2, . . . , 348-N coupled to the memory 349 can execute CRI 345 to cap power consumption of the number of other devices.

Figure 4A:
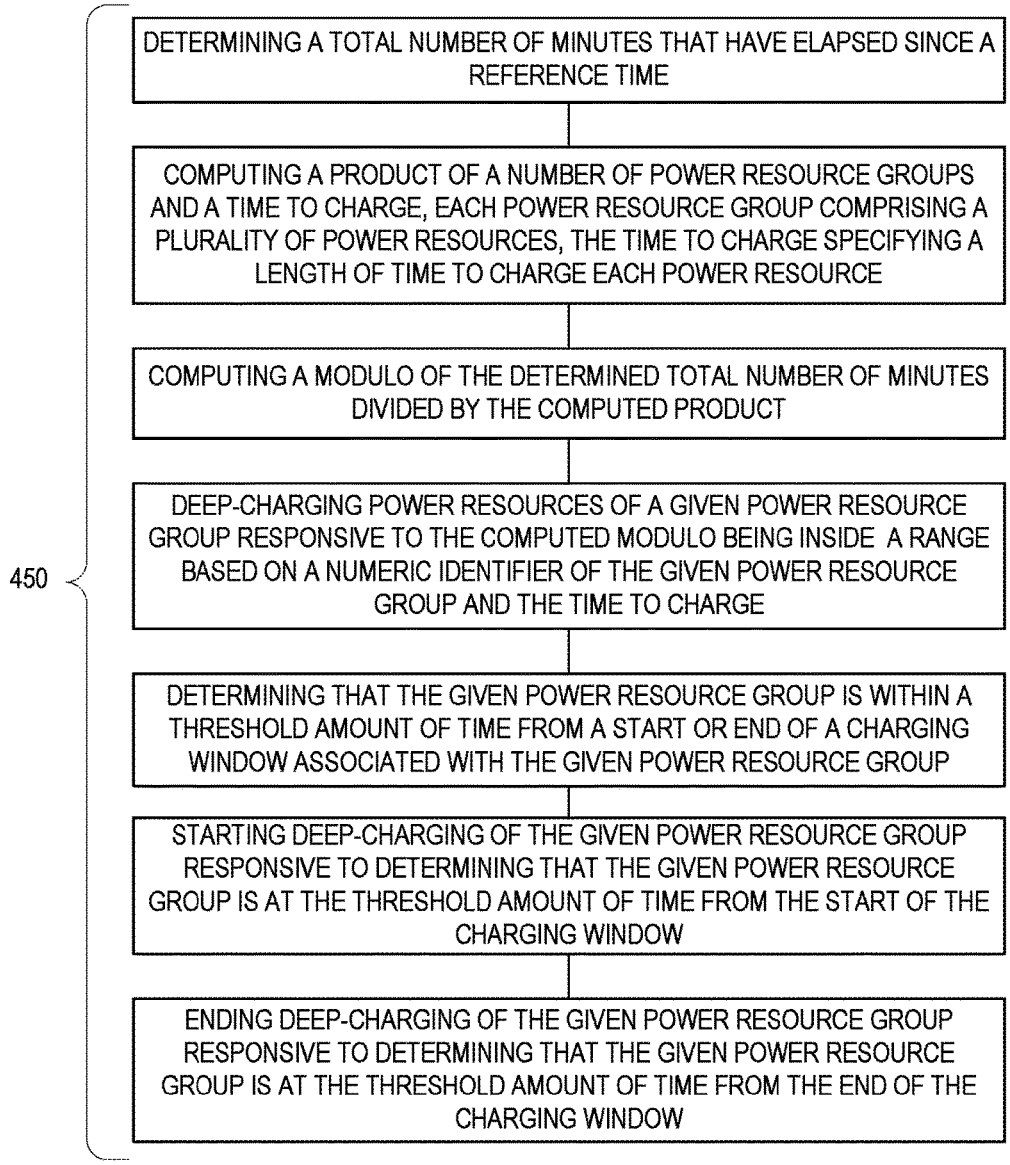
FIG. 4A illustrates a flow chart of an example method for moderating a charging for a number of power resource groups according to the present disclosure.

FIG. 4A illustrates a flow chart 450 of an example method for moderating a charging for a number of power resource groups according to the present disclosure.

Figure 4B:
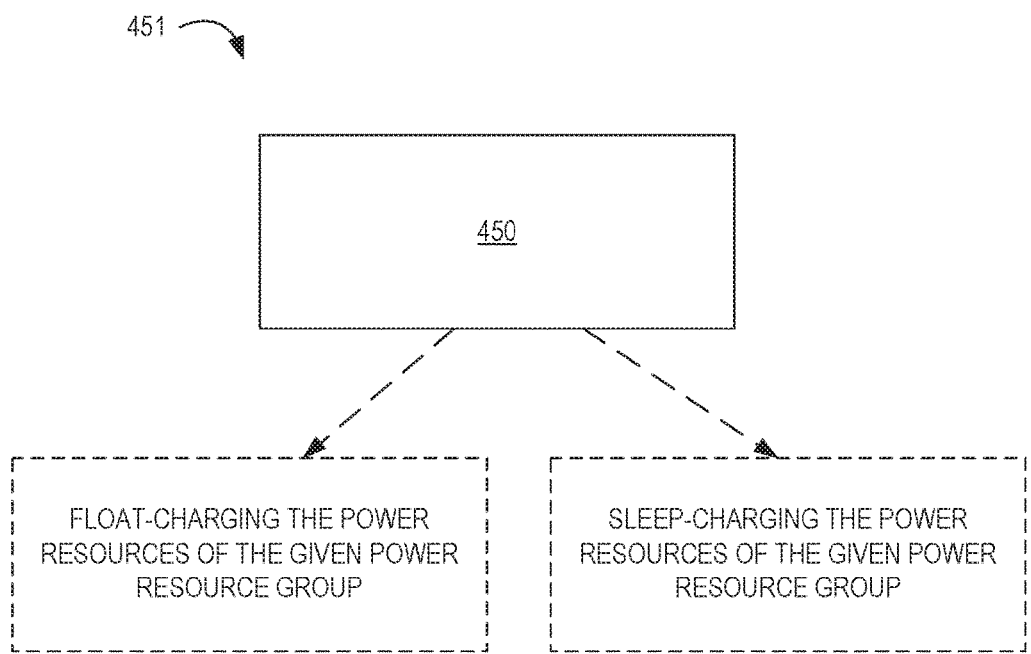
FIG. 4B illustrates another flow chart of an example method for moderating a charging for a number of power resource groups according to the present disclosure.

FIG. 4B illustrates another flow chart 451 of an example method for moderating a charging for a number of power resource groups according to the present disclosure.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method comprising:
   determining a total number of minutes that have elapsed since a reference time;
   computing a product of a number of power resource groups and a time to charge, each power resource group comprising a plurality of power resources, the time to charge specifying a length of time to charge each power resource;
   computing a modulo of the determined total number of minutes divided by the computed product;
   deep-charging power resources of a given power resource group responsive to the computed modulo being inside a range based on a numeric identifier of the given power resource group and the time to charge;
   determining that the given power resource group is within a threshold amount of time from a start or an end of a charging window associated with the given power resource group;
   starting deep-charging of the given power resource group responsive to determining that the given power resource group is at the threshold amount of time from the start of the charging window; and ending deep-charging of the given power resource group responsive to determining that the given power resource group is at the threshold amount of time from the end of the charging window.

2. The method of claim 1, further comprising:
float-charging the power resources of the given power resource group responsive to the computed modulo being outside the range.

3. The method of claim 1, further comprising:
sleep-charging the power resources of the given power resource group responsive to the computed modulo being outside the range.

4. The method of claim 1, wherein deep-charging the power resources comprises instructing chargers of the power resources to deep-charge the power resources.

5. The method of claim 1, wherein the range has a lower bound equal to a product of the time to charge and the numeric identifier.

6. The method of claim 5, wherein the range has an upper bound equal to a product of the time to charge and a sum of the numeric identifier and one.

7. The method of claim 5, wherein the range has an upper bound equal to a product of the time to charge and a sum of the numeric identifier and one, minus a predetermined length of time.

8. A system comprising:
a plurality of power resources organized into a number of power resource groups identified by numeric identifiers, the power resources having a time to charge specifying a length of time to charge the power resources; and
a controller to:
control charging of the power resources by deep-charging the power resources of the power resource group having the numeric identifier corresponding to a range within which a modulo falls,
wherein the controller is to determine the modulo of a total number of minutes that have elapsed since a reference time, divided by a product of the number of power resource groups and the time to charge;
determine that a particular power resource group is within a threshold amount of time from a start or an end of a charging window associated with the particular power resource group;
start deep-charging the particular power resource group responsive to determining that the particular power resource group is at the threshold amount of time from the start of the charging window; and
stop deep-charging the particular power resource group responsive to determining that the particular power resource group is at the threshold amount of time from the end of the charging window.

9. The system of claim 8, wherein the controller is to control the charging of the power resources by float-charging the power resources of the power resource group having the numeric identifiers corresponding to ranges outside of which the modulo falls.

10. The system of claim 8, wherein the controller is to control the charging of the power resources by sleep-charging the power resources of the power resource group having the numeric identifiers corresponding to ranges outside of which the modulo falls.

11. The system of claim 8, wherein the range has a lower bound equal to a product of the time to charge and the numeric identifier.

12. The system of claim 11, wherein the range has an upper bound equal to a product of the time to charge and a sum of the numeric identifier and one.

13. The system of claim 11, wherein the range has an upper bound equal to a product of the time to charge and a sum of the numeric identifier and one, minus a predetermined length of time.

14. A non-transitory computer-readable data storage medium storing computer-executable code that a controller for a plurality of power resources organized into power resource groups identified by numeric identifiers executes to:
determine a total number of minutes that have elapsed since a reference time;
compute a product of a number of the power resource groups and a time to charge specifying a length of time to charge each power resource;
compute a modulo of the determined total number of minutes divided by the computed product;
deep-charge the power resources of the power resource group having the numeric identifier corresponding to a range within which the modulo falls;
determine that the power resource group having the numeric identifier corresponding to a range within which the modulo falls is within a threshold amount of time from a start or an end of a charging window associated with the particular power resource group;
starting deep-charging the power resource group having the numeric identifier corresponding to a range within which the modulo falls responsive to determining that the particular power resource group is at the threshold amount of time from the start of the charging window; and
stop deep-charging the power resource group having the numeric identifier corresponding to a range within which the modulo falls responsive to determining that the particular power resource group is at the threshold amount of time from the end of the charging window.

15. The non-transitory computer-readable data storage medium of claim 14, wherein the controller executes the computer-execute code to further:
float-charge the power resources of the power resource group having the numeric identifiers corresponding to ranges outside of which the modulo falls.

16. The non-transitory computer-readable data storage medium of claim 14, wherein the controller executes the computer-execute code to further:
sleep-charge the power resources of the power resource group having the numeric identifiers corresponding to ranges outside of which the modulo falls.

17. The non-transitory computer-readable data storage medium of claim 14, wherein the range has a lower bound equal to a product of the time to charge and the numeric identifier.

18. The non-transitory computer-readable data storage medium of claim 17, wherein the range has an upper bound equal to a product of the time to charge and a sum of the numeric identifier and one.

19. The non-transitory computer-readable data storage medium of claim 17, wherein the range has an upper bound equal to a product of the time to charge and a sum of the numeric identifier and one, minus a predetermined length of time.

* * * * *